United States Patent
Michael et al.

(10) Patent No.: US 7,438,836 B2
(45) Date of Patent: *Oct. 21, 2008

(54) DISPERSION AND COATING PREPARATION CONTAINING NANOSCALE ZINC OXIDE

(75) Inventors: Guenther Michael, Karlstein (DE);
Stefan Heberer, Geinhausen (DE);
Ruediger Mertsch, Wiesbaden (DE);
Robert Maier, Wolfertschwenden (DE);
Simone Jetton, Memmingen (DE);
Frans De Peuter, Mol (BE)

(73) Assignee: Evonik Degussa GmbH, Essen (DE)

( * ) Notice: Subject to any disclaimer, the term of this patent is extended or adjusted under 35 U.S.C. 154(b) by 650 days.

This patent is subject to a terminal disclaimer.

(21) Appl. No.: 11/039,871

(22) Filed: Jan. 24, 2005

(65) Prior Publication Data

US 2005/0182174 A1 Aug. 18, 2005

(30) Foreign Application Priority Data

Jan. 24, 2004 (DE) .................. 10 2004 003 675

(51) Int. Cl.
*H01B 1/00* (2006.01)
*H01B 1/12* (2006.01)
*C01G 9/02* (2006.01)

(52) U.S. Cl. .............. 252/518.1; 106/425; 106/604; 106/753; 424/59; 424/63; 424/401; 424/432; 502/323; 524/430; 524/432; 252/519.5; 252/500

(58) Field of Classification Search ............... 524/432, 524/430; 428/323, 328, 402; 252/500; 106/425, 106/604, 753; 424/59, 63, 401, 432; 502/323
See application file for complete search history.

(56) References Cited

U.S. PATENT DOCUMENTS

| | | | | |
|---|---|---|---|---|
| 4,193,769 A * | 3/1980 | Cheng et al. | .................. | 44/357 |
| 5,366,660 A * | 11/1994 | Tapley | ......................... | 516/33 |
| 5,441,726 A * | 8/1995 | Mitchnick et al. | ............. | 424/59 |
| 5,827,507 A * | 10/1998 | Oshima et al. | ................ | 424/59 |
| 5,968,529 A * | 10/1999 | Horino et al. | ................ | 424/401 |
| 6,136,939 A * | 10/2000 | Mager et al. | ................... | 528/33 |
| 6,200,680 B1 * | 3/2001 | Takeda et al. | ............... | 428/402 |
| 6,335,002 B1 * | 1/2002 | Kogoi et al. | ................. | 424/63 |
| 6,710,091 B1 * | 3/2004 | Womelsdorf et al. | .......... | 516/33 |
| 6,723,423 B1 * | 4/2004 | Kaneko et al. | ............. | 428/323 |
| 2003/0172845 A1 * | 9/2003 | Marx et al. | ................ | 106/425 |
| 2004/0071958 A1 * | 4/2004 | Marx et al. | ................ | 428/328 |
| 2005/0048010 A1 * | 3/2005 | Kliss et al. | .................... | 424/59 |
| 2005/0069506 A1 | 3/2005 | Katusic et al. | | |
| 2005/0182174 A1 | 8/2005 | Michael et al. | | |
| 2006/0073092 A1 | 4/2006 | Katusic et al. | | |
| 2007/0037699 A1 | 2/2007 | Katusic et al. | | |

FOREIGN PATENT DOCUMENTS

CN          1389520          1/2003

(Continued)

*Primary Examiner*—Mark Kopec
*Assistant Examiner*—Khanh Tuan Nguyen
(74) *Attorney, Agent, or Firm*—Oblon, Spivak, McClelland, Maier & Neustadt, P.C.

(57) ABSTRACT

The present invention provides a dispersion, which contains nano-sized zinc oxide particles, a coating preparation containing the dispersion, a process for the production of the dispersion, and a coating preparation containing the dispersion, and a use of the coating preparation.

18 Claims, 1 Drawing Sheet

FOREIGN PATENT DOCUMENTS

| | | |
|---|---|---|
| DE | 199 07 704 A1 | 8/2000 |
| DE | 102 12 680 A1 | 10/2003 |
| EP | 0597380 A1 * | 11/1993 |
| EP | 0 761 774 A1 | 3/1997 |
| WO | WO 03/018696 A1 | 3/2003 |
| WO | WO 03/080515 A1 | 10/2003 |

* cited by examiner

DISPERSION AND COATING PREPARATION CONTAINING NANOSCALE ZINC OXIDE

CROSS-REFERENCE TO RELATED APPLICATIONS

The present application claims priority to German Application No. DE 10 2004 003 675.6, filed on Jan. 24, 2004, which is hereby incorporated by reference in its entirety.

BACKGROUND OF THE INVENTION

1. Field of the Invention

The present invention provides a dispersion, which contains nano-sized (used interchangeably herein as "nanoscale") zinc oxide particles, a coating preparation containing the dispersion, a process for the production of the dispersion, and a coating preparation containing the dispersion, and a use of the coating preparation.

2. Discussion of the Background

Protection of products, including wood, PVC, plastic, steel, aluminium, zinc, copper, glass, concrete, by the application of a transparent coating in the form of paints and lacquers is known in the art. However, this protection is generally restricted to internal applications, as the transparent coatings are not UV stable. UV light can penetrate the coating and damage, or in the worst case even destroy, the coating and the substrate beneath it.

Various attempts to produce transparent UV-resistant coatings are disclosed in the prior art. However, at the time of the present invention, the inventors do not know of any systems that simultaneously guarantee continuous UV protection and transparency.

SUMMARY OF THE INVENTION

It is an object of the present invention to provide a transparent, UV-resistant coating for substrates and/or products that are preferably used for external applications. Furthermore, it is an object of the present invention to provide a coating composition that is free of the disadvantages disclosed in the prior art of use for external applications, such as cracks and degradation of the bond to the substrate or discolouration of the substrate.

More specifically, it is an object of the present invention to provide a dispersion containing zinc oxide powder and at least one additive, wherein said zinc oxide powder has:
a BET specific surface area of 10 to 200 m$^2$/g;
an average secondary particle size in the dispersion of less than 300 nm; and
a solid content of between 0.1 and 60 wt. % in relation to the total quantity of the dispersion.

Within this object, the additives may be, inter alia, one or more dispersion auxiliary substances, an emulsifiers, a pH value regulators, and a stabilisers.

Further, with this object, the zinc oxide in said zinc oxide powder may be in the form of aggregates of anisotropic primary particles, in particular where the aggregates are built up of particles possessing varying morphologies.

Also, with in the object above, the zinc oxide powder in the dispersion may hydrophobised using one or more hydrophobising agents.

It has also advantageous within this object for the dispersion to contain no more than 20 ppm lead; no more than 3 ppm arsenic; no more than 15 ppm cadmium; no more than 200 ppm iron; no more than 1 ppm antimony; and no more than 1 ppm mercury.

In another object of the present invention is to provide a process for the production of a dispersion by incorporating a zinc oxide powder into a liquid medium by high energy input under dispersing conditions and adding said at least one additive before, during or after the dispersing conditions.

Another object of the present invention is a coating preparation containing the aforementioned dispersion and at least one binder, which may also contain at least one rheology improving compound and/or at least one organic solvent.

To this end, an object of the present invention is to provide a process for the production of a coating preparation entailing adding the aforementioned dispersion to at least one binder under dispersing conditions.

In yet another object of the present invention is a method of making a coated product, which is obtained by applying the aforementioned coating preparation to at least one surface of a product, where the product may be wood, PVC, plastic, steel, aluminium, MDF, zinc, copper, glass, and/or concrete.

The above objects highlight certain aspects of the invention. Additional objects, aspects and embodiments of the invention are found in the following detailed description of the invention.

BRIEF DESCRIPTION OF THE FIGURES

A more complete appreciation of the invention and many of the attendant advantages thereof will be readily obtained as the same becomes better understood by reference to the following Figures in conjunction with the detailed description below.

DETAILED DESCRIPTION OF THE INVENTION

Figure 1:
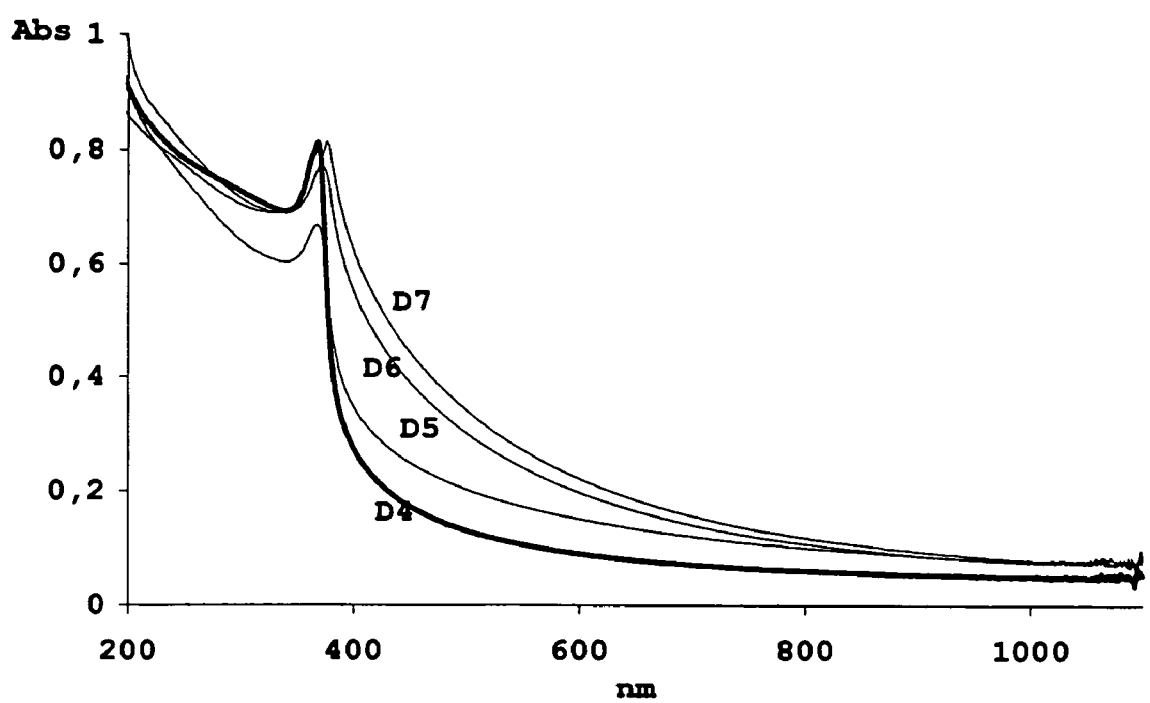
FIG. 1 shows that dispersion D4 (see Examples) according to the invention has high absorption in the UV-A range and at the same time high transparency. In comparison with dispersions D5 to D7 dispersion, D4 has a clear advantage in transparency with at least comparable UV absorption.

Unless specifically defined, all technical and scientific terms used herein have the same meaning as commonly understood by a skilled artisan in chemistry and materials science.

All methods and materials similar or equivalent to those described herein can be used in the practice or testing of the present invention, with suitable methods and materials being described herein. All publications, patent applications, patents, and other references mentioned herein are incorporated by reference in their entirety. In case of conflict, the present specification, including definitions, will control. Further, the materials, methods, and examples are illustrative only and are not intended to be limiting, unless otherwise specified.

The present invention provides a dispersion, which contains zinc oxide powder and at least one additive, where the zinc oxide power has a BET specific surface area of 10 to 200 m$^2$/g, an average secondary particle size in the dispersion of less than 300 nm and a solids content of 0.1 to 60 wt. % (preferably of 1 to 10 wt. %) in relation to the total quantity of the dispersion.

The dispersion according to the present invention may be either aqueous or organic. Alternatively, the dispersion may be comprised of a mixture having water or organic solvents as the liquid phase. In any case, only a single liquid phase is present.

"Aqueous" is to be understood to mean that the predominant part of the liquid phase consists of water.

"Organic" is to be understood to mean that the liquid phase consists predominantly or exclusively of at least one organic solvent.

Suitable organic solvents for use in the present invention include: ethanol, methanol, propanol, butanol, acetone, ethyl acetate, butyl acetate, alkanes and/or ethers. The organic solvents can also be a reactive diluent, such as hexanediol diacrylate or tripropyleneglycol diacrylate.

An aqueous dispersion is preferred according to the invention.

The dispersion according to the present invention contains at least one additive. The additives may be a dispersion auxiliary substance, an emulsifier, a pH-regulating substance and/or a stabiliser. Preferably, the additive is Na-polyphosphate, ascorbic acid, citric acid, 6-aminohexanoic acid, stearic acid and/or salts of polyacrylic acid, in particular the sodium salt. The additive is preferably present in a quantity of 0.1 to 5 wt. %, particularly preferably of 0.5 to 1.5 wt. % in relation to the liquid phase of the dispersion.

The type of zinc oxide present in the dispersion according to the present invention is restricted only to the extent that it has a BET specific surface area of 10 to 200 $m^2/g$ and an average secondary particle size in the dispersion of less than 300 nm.

The dispersion according to the present invention preferably contains a zinc oxide, having a BET specific surface area of 10 to 200 $m^2/g$ and an average secondary particle size in the dispersion of less than 300 nm, and which is present in the form of aggregates of anisotropic primary particles. A zinc oxide of this kind is disclosed in DE-A-10212680 (incorporated herein by reference).

"Anisotropic" is to be understood to mean that the arrangement of the atoms along the three spatial axes varies. Particles that are needle-like, node-like or plate-like are to be understood as examples of anisotropic primary particles. In particular, the aggregates of a mixture of node-like primary particles and needle-like primary particles may be present, the ratio of node-like to needle-like primary particles being from 99:1 to 1:99. The node-like primary particles of the zinc oxide preferably have an average diameter of 10 to 50 nm and the needle-like primary particles preferably have a length of 100 nm to 2000 nm, a width of 10 nm to 100 nm. The aggregates of the zinc oxide powder may have a structure that is as far as possible anisotropic, defined by a shape factor F (Circle) of less than 0.5. The dimension F (Circle) describes the deviation of an aggregate from an ideal circle shape. F (Circle) is equal to 1 for an ideal circle-shaped object. The lower the value, the further the structure is from the ideal circle shape. The parameter is defined according to ASTM 3849-89.

The zinc oxide powder can have on its surface an oxygen concentration as non-desorbable moisture in the form of Zn—OH and/or Zn—OH2-units of at least 40%. This is measured by XPS analysis (XPS=X-ray-Photoelectron-Spectroscopy) of the oxygen signals at 532 to 533 eV and 534 to 535 eV. The bulk density of the zinc oxide powder can be 40 to 120 g/l.

Furthermore, a zinc oxide powder such as that described in German patent application number DE10342728.2, filed on Sep. 22, 2003 (incorporated herein by reference), may be present in the dispersion according to the present invention. This zinc oxide powder is a pyrogenically-produced zinc oxide powder with a BET specific surface area of 10 to 200 $m^2/g$, which is present in the form of aggregates. The aggregates are built up of particles of varying morphology and 0-10% of the aggregates being present in a circular form, 30-50% in an ellipsoidal form, 30-50% in a linear form, 20-30% in a branched form.

Particles according to the present invention are to be understood to be those formed primarily in the pyrogenic production process. The particles combine during the reaction to aggregates forming sintered surfaces. It is essential here that these aggregates are built up of particles of varying morphology. According to this definition, an aggregate is composed of the same or virtually the same particles, the primary particles (DIN 53206). The zinc oxide powder on the other hand has aggregates that contain particles of varying morphology, and are thus not described as primary particles.

"Morphology" is to be understood to mean both isotropic and anisotropic particles. These can be, for example, spherical particles or particles that are as far as possible spherical, node-like particles, rod-like particles or needle-like particles. The essential point is that the aggregates consist of differing particles and that these particles are bound to each other by sintered surfaces. The BET specific surface area of the zinc oxide powder may be from 20 to 60 $m^2/g$.

The aggregates of the zinc oxide powder according to the present invention are present in circular, ellipsoidal, linear and branched forms. The zinc oxide powders are preferably those that have a virtually identical proportion of 30-40% of ellipsoidal and linear forms and a smaller proportion of 20-25% of branched forms and of 2-6% of circular forms.

The zinc oxide powder may have a tamped density, determined to DIN ISO 787/11, of at least 50 g/l.

It is also possible for the zinc oxide powder to be composed of aggregates having an average projected aggregate surface area of less than 10000 $nm^2$, an equivalent circle diameter (ECD) of less than 100 nm and an average circumference of less than 600 nm. These dimensions can be obtained from TEM image analysis of ca 1000 to 2000 aggregates. Zinc oxide powders with an average, projected aggregate surface area of 2000 to 8000 $nm^2$, an equivalent circle diameter (ECD) of 25 to 80 nm and an average circumference of between 200 and 550 nm are particularly preferred.

Instead of zinc oxide powder, the dispersion according to the present invention may contain hydrophobised zinc oxide powder. The following compounds may be used to hydrophobise the zinc oxide:

a) Organosilanes of the type
$(RO)_3Si(C_nH_{2n+1})$ and $(RO)_3Si(C_nH_{2n-1})$ where
R=alkyl, such as for example methyl-, ethyl-, n-propyl-, i-propyl-, butyl-; n=1-20 b) Organosilanes of the type
$R'_x(RO)_ySi(C_nH_{2n+1})$ and $R'_x(RO)_ySi(C_nH_{2n-1})$ where
R=alkyl, for example methyl-, ethyl-, n-propyl-, i-propyl-, butyl-
R'=alkyl, for example methyl-, ethyl-, n-propyl-, i-propyl-, butyl-, cycloalkyl;
n=1-20; x+y=3; x=1.2; y=1.2;

c) Halogen organosilanes of the type
$X_3Si(C_nH_{2n+1})$ and $X_3Si(C_nH_{2n-1})$ where
X=Cl, Br; n=1-20 d) Halogen organosilanes of the type
$X_2(R')Si(C_nH_{2n+1})$ and $X_2(R')Si(C_nH_{2n-1})$
X=Cl, Br; R'=alkyl, for example methyl-, ethyl-, n-propyl-, i-propyl-, butyl-, cycloalkyl; n=1-20 e) Halogen organosilanes of the type
$X(R')_2Si(C_nH_{2n+1})$ and $X(R')_2Si(C_nH_{2n-1})$
X=Cl, Br; R'=alkyl, for example methyl-, ethyl-, n-propyl-, i-propyl-, butyl-, cycloalkyl; n=1-20 f) Organosilanes of the type $(RO)_3Si(CH_2)_m$—R' where
R=alkyl, for example methyl-, ethyl-, n-propyl-, i-propyl-, butyl-, cycloalkyl; m=0, 1-20;
R'=methyl-, aryl (for example —$C_6H_5$, substituted phenyl radicals), —$C_4F_9$, $OCF_2$—CHF—$CF_3$, —$C_6F_{13}$, —O—CF$_2$—CHF$_2$, —NH$_2$, —N$_3$, —SCN, —CH=CH$_2$, —NH—CH$_2$—CH$_2$—NH$_2$, —N—(CH$_2$—CH$_2$—NH$_2$)$_2$, —OOC(CH$_3$)C=CH$_2$, —OCH$_2$—CH(O)CH$_2$, —NH—CO—N—CO—(CH$_2$)$_5$, —NH—COO—CH$_3$, —NH—COO—CH$_2$—CH$_3$, —NH—(CH$_2$)$_3$Si(OR)$_3$, —S$_x$—(CH$_2$)$_3$Si(OR)$_3$, —SH, —NR'R'' R''' (R'=alkyl, aryl; R''=H, alkyl, aryl; R'''=H, alkyl, aryl, benzyl, C$_2$H$_4$NR''''R''''' where R''''=H, alkyl and R'''''=H, alkyl)

g) Organosilanes of the type (R'')$_x$(RO)$_y$Si(CH$_2$)$_m$—R' where R''=alkyl, cycloalkyl; x+y=2; x=1.2; y=1.2; m=0.1 to 20
R'=methyl-, aryl (for example —C$_6$H$_5$, substituted phenyl radicals), —C$_4$F$_9$, —OCF$_2$—CHF—CF$_3$, —C$_6$F$_{13}$, —O—CF$_2$—CHF$_2$, —NH$_2$, —N$_3$, —SCN, —CH=CH$_2$, —NH—CH$_2$—CH$_2$—NH$_2$, —N—(CH$_2$—CH$_2$—NH$_2$)$_2$, —OOC(CH$_3$)C=CH$_2$, —OCH$_2$—CH(O)CH$_2$, —NH—CO—N—CO—(CH$_2$)$_5$, —NH—COO—CH$_3$, —NH—COO—CH$_2$—CH$_3$, —NH—(CH$_2$)$_3$Si(OR)$_3$, —S$_x$—(CH$_2$)$_3$Si(OR)$_3$, —SH, —NR'R'' R''' (R'=alkyl, aryl; R''=H, alkyl, aryl; R'''=H, alkyl, aryl, benzyl; C$_2$H$_4$NR''''R''''' where R''''=H, alkyl and R'''''=H, alkyl)

h) Halogen organosilanes of the type X$_3$Si(CH$_2$)$_m$—R' where X=Cl, Br; m=0.1-20;
R'=methyl-, aryl (for example —C$_6$H$_5$, substituted phenyl radicals), —C$_4$F$_9$, —OCF$_2$—CHF—CF$_3$, —C$_6$F$_{13}$, —O—CF$_2$—CHF$_2$, —NH$_2$, —N$_3$, —SCN, —CH=CH$_2$, —NH—CH$_2$—CH$_2$—NH$_2$, —N—(CH$_2$—CH$_2$—NH$_2$)$_2$, —OOC(CH$_3$)C=CH$_2$, —OCH$_2$—CH(O)CH$_2$, —NH—CO—N—CO—(CH$_2$)$_5$, —NH—COO—CH$_3$, —NH—COO—CH$_2$—CH$_3$, —NH—(CH$_2$)$_3$Si(OR)$_3$, —S$_x$—(CH$_2$)$_3$Si(OR)$_3$, —SH i) Halogen organosilanes of the type (R)X$_2$Si(CH$_2$)$_m$—R' where
X=Cl, Br; R=alkyl, for example methyl-, ethyl-, propyl-, butyl; m=0,1-20; R'=methyl-, aryl (e.g. —C$_6$H$_5$, (for example —C$_6$H$_5$, substituted phenyl radicals), —C$_4$F$_9$, —OCF$_2$—CHF—CF$_3$, —C$_6$F$_{13}$, —O—CF$_2$—CHF$_2$, —NH$_2$, —N$_3$, —SCN, —CH=CH$_2$, —NH—CH$_2$—CH$_2$—NH$_2$, —N—(CH$_2$—CH$_2$—NH$_2$)$_2$—OOC(CH$_3$)C=CH$_2$, —OCH$_2$—CH(O)CH$_2$, —NH—CO—N—CO—(CH$_2$)$_5$, —NH—COO—CH$_3$, —NH—COO—CH$_2$—CH$_3$, —NH—(CH$_2$)$_3$Si(OR)$_3$, wherein R=methyl-, ethyl-, propyl-, butyl-; —S$_x$—(CH$_2$)$_3$Si(OR)$_3$, wherein R=methyl-, ethyl-, propyl-, butyl-; —SH j) Halogen organosilanes of the type (R)$_2$X Si(CH$_2$)$_m$—R' where
X=Cl, Br; R=alkyl; m=0,1-20
R'=methyl-, aryl (for example —C$_6$H$_5$, substituted phenyl radicals), —C$_4$F$_9$, —OCF$_2$—CHF—CF$_3$, —C$_6$F$_{13}$, —O—CF$_2$—CHF$_2$, —NH$_2$, —N$_3$, SCN, —CH=CH$_2$, —NH—CH$_2$—CH$_2$—NH$_2$, —N—(CH$_2$—CH$_2$—NH$_2$)$_2$, —OOC(CH$_3$)C=CH$_2$, —OCH$_2$—CH(O)CH$_2$, —NH—CO—N—CO—(CH$_2$)$_5$, —NH—COO—CH$_3$, —NH—COO—CH$_2$—CH$_3$, —NH—(CH$_2$)$_3$Si(OR)$_3$, —S$_x$—(CH$_2$)$_3$Si(OR)$_3$, —SH k) Silazanes of the type R'R$_2$Si—NH—SiR$_2$R'
R=R'=alkyl, vinyl, aryl l) Cyclic polysiloxanes of the type D3, D4, D5, wherein D3, D4 and D5 are cyclic polysiloxanes having 3, 4 or 5 units of the type —O—Si(CH$_3$)$_2$—. For example: octamethyl cyclotetrasiloxane=D4

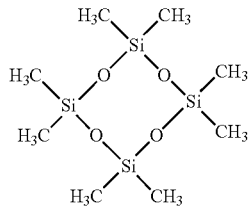

m) Polysiloxanes or silicone oils of the type

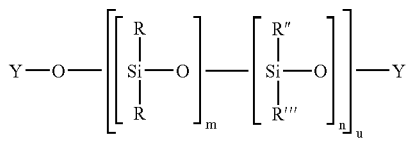

m = 0,1,2,3, ... ∞
n = 0,1,2,3, ... ∞
u = 0,1,2,3, ... ∞
Y = CH$_3$, H, C$_n$H$_{2n+1}$ n = 1–20
Y = Si(CH$_3$)$_3$, Si(CH$_3$)$_2$H
Si(CH$_3$)$_2$OH, Si(CH$_3$)$_2$(OCH$_3$),
Si(CH$_3$)$_2$(C$_n$H$_{2n+1}$) n = 1–20

R=alkyl, for example C$_n$H$_{2n+1}$, where n=1 to 20, aryl such as phenyl and substituted phenyl radicals; (CH$_2$)$_n$—NH$_2$, H
R'=alkyl, for example C$_n$H$_{2n+1}$, where n=1 to 20, aryl such as phenyl and substituted phenyl radicals; (CH$_2$)$_n$—NH$_2$, H
R''=alkyl, for example C$_n$H$_{2n+1}$, where n=1 to 20, aryl such as phenyl and substituted phenyl radicals; (CH$_2$)$_n$—NH$_2$, H
R'''=alkyl, for example C$_n$H$_{2n+1}$, where n=1 to 20, aryl such as phenyl and substituted phenyl radicals; (CH$_2$)$_n$—NH$_2$, H In a preferable embodiment, the dispersion according to the present invention may contain a zinc oxide powder hydrophobised with octyl trimethoxysilane or polydimethyl siloxane. The hydrophobised zinc oxide powder preferably has a BET specific surface area of 10 to 50 m$^2$/g.

More preferably, the hydrophobised zinc oxide powder has a BET specific surface area of 18±5 m$^2$/g and a carbon content of 0.5 to 1.0 wt. %. This powder and its production are provided by the European patent application EP03018678-7, filed on Aug. 22, 2003 (incorporated herein by reference).

The hydrophobised zinc oxide powder may be produced by spraying the surface-modified material onto the zinc oxide powder, which is optionally sprayed with water, at room temperature. Subsequently, the sprayed surface-modified material is heat treated at 50 to 400° C. over a period of 1 to 6 hours.

The hydrophobised zinc oxide powder may also be obtained by treating the zinc oxide powder, which was optionally sprayed with water, with the vapours of the surface-modifying material and then heat treating the mixture at 50 to 800° C. over a period of 0.5 to 6 hours.

In an embodiment of the present invention, the zinc oxide powder in the dispersion according to the invention may contain a proportion of no more than 20 ppm lead, of no more than 3 ppm arsenic, of no more than 15 ppm cadmium, of no more than 200 ppm iron, of no more than 1 ppm antimony and of no more than 1 ppm mercury.

The invention further provides a process for the production of the dispersion according to the present invention. In this embodiment, the zinc oxide powder is applied by high energy input under dispersing conditions in a liquid medium. A high energy input is necessary to obtain zinc oxide particles of the required fineness of less than 300 nm in the dispersion.

During this process, the additive(s) may be added before, during or after dispersion. The additive should protect the dispersion from re-agglomeration and sedimentation. The quantity of the additive(s) depends on the content of zinc oxide in the dispersion and on whether the dispersion is to be transported over long distances and thus needs to be resistant to sedimentation, or whether the dispersion is to be processed further immediately after its production.

Suitable dispersion devices, which effect a high energy input, can be rotor-stator machines, planetary mixers, ultrasound devices or high-pressure homogenisers, for example a Nanomizer® or an Ultimizer® system.

The present invention further provides a coating preparation, which contains the dispersion according to the present invention and at least one binder.

Suitable binders include: polyacrylates, polyurethanes, polyalkyds, polyepoxides, polysiloxanes, polyacrylonitriles and/or polyesters. For dispersions that have one or more reactive diluents as the liquid phase, an aliphatic urethane acrylate, for example Laromer® LR8987, BASF, may be particularly suitable as the binder.

The coating preparation according to the invention preferably contains a polyacrylate(s) and/or a polyurethane(s).

The proportion of the binder in the coating preparation is preferably 0.1 to 50 wt. %. A range of 1 to 10 wt. % is particularly preferred.

The proportion of zinc oxide in the coating preparation is preferably 0.1 to 60 wt. %. A range of 1 to 10 wt. % is particularly preferred.

The coating preparation may also contain, during application, one or more rheology improving compounds. Fillers containing silicon dioxide are particularly advantageous. Pyrogenically produced silicon dioxide is particularly preferred. The quantity of this compound(s) is preferably 0.1 to 20 wt. %, in relation to the coating preparation as a whole.

The coating compound may also contain an organic solvent(s), including: ethanol, butyl acetate, ethyl acetate, acetone, butanol, THF, alkanes or mixtures of two or more of these substances in quantities of 1 to 98 wt. % in relation to the coating preparation as a whole.

The present invention also provides a process for the production of a coating preparation in which a dispersion, as described above, is added to a binder under dispersing conditions.

The invention further provides the use of the coating preparation according to the present invention to coat at least one surface of substrates/products, including wood, PVC, plastic, steel, aluminium, zinc, copper, MDF, glass, concrete.

The advantages of using the dispersion and coating composition according to the present invention, as opposed to those of the prior art for external applications, include:

transparent, UV-resistant coating of substrates;
very slight tendency to yellowing of the coating;
no discolouration of the substrate;
greater scratch resistance; and
significantly less marked crack formation, brittleness and chipping of the coating.

The above written description of the invention provides a manner and process of making and using it such that any person skilled in this art is enabled to make and use the same, this enablement being provided in particular for the subject matter of the appended claims, which make up a part of the original description.

As used above, the phrases "selected from the group consisting of," "chosen from," and the like include mixtures of the specified materials.

Where a numerical limit or range is stated herein, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

Having generally described this invention, a further understanding can be obtained by reference to certain specific examples, which are provided herein for purposes of illustration only, and are not intended to be limiting unless otherwise specified.

EXAMPLES

Zinc Oxide Dispersion D-1:

A zinc oxide powder produced according to DE-A-10212680 with a BET specific surface area of 20 m$^2$/g was used.

Up to 53.5 wt. % zinc oxide powder was added in portions whilst stirring into 50 g water, to which 0.1 wt. % polyacrylic acid in the form of the sodium salt was added and this mixture was dispersed for a minute in each case with an ultrasound finger (diameter: 7 mm, Device: Ultrasound processor UP 400 s, output: 400 W, Dr. Hielscher). The dispersion always remained highly fluid. Once a final concentration of 53.5 wt. % zinc oxide was achieved, dispersion was continued for 2 minutes with water-cooling.

The dispersion remained highly fluid, even after 30 days, had no sediment and was, therefore, easy to handle. The pH value was approximately 10. The PCS aggregate particle distribution (volume distribution) was $d_{50}$=180 nm.

Zinc Oxide Dispersion D-2:

Produced in the same way as D-1, but with a fill level of 10 wt. %.

Zinc Oxide Dispersion D-3:

Produced in the same way as D-2, but using a hydrophobised zinc oxide powder and a 50:50 water-ethanol mixture (proportion by volume) instead of water. The hydrophobised zinc oxide powder was obtained in accordance with the European patent application number 3018678.7 filed on Aug. 22, 2003 (incorporated herein by reference). The zinc oxide powder was hydrophobised with octyl trimethoxysilane with a BET specific surface area of 18 m$^2$/g and a carbon content of 0.6%.

Acrylic/polyurethane-based Coating Preparation B-2A/PU:

The zinc oxide dispersion D-2 was added under dispersing conditions to a commercial acrylic/polyurethane binder, so that a coating preparation containing 2 wt. % zinc oxide dispersion was obtained.

Acrylic-based Coating Preparation B-2A

Method as for B-2A/PU, except a commercial acrylic binder preparation was employed.

Acrylic/polyurethane-based Coating Preparation B-3A/PU:

The zinc oxide dispersion D-3 was added under dispersing conditions to a commercial acrylic/polyurethane binder preparation. Accordingly, a coating preparation containing a 2 wt. % hydrophobised zinc oxide dispersion was obtained.

Acrylic-based Coating Preparation B-3A:

Method as for B-3A/PU, except a commercial acrylic binder preparation was used.

UV-resistance When Coating Wood:

Three samples each of pine wood pre-treated with a primer (Relius Aqua Holz Grund), were coated with the coating preparations from example B-2A/PU and B-2A. (QUV-B 313; DIN EN 927-6, ISO 11507, ASTM D 4857). Pine wood samples with a zinc oxide-free acrylic/polyurethane-based coating preparation (Relius Aqua Siegel Gloss) were used as a reference.

After a test time of 1000 hours, the zinc oxide-containing coatings from example B-2AP and B-2A had significantly less yellowing, a significantly higher gloss and no brittleness or cracking of the coating, in comparison with the zinc oxide-free coating.

These results were confirmed by the field test to DIN-EN 927-1.

Hardness When Coating Glass:

The coating preparations from examples B-2A/PU and B-2A, and also a zinc oxide-free acrylic/polyurethane-based coating preparation (Relius Aqua Siegel Gloss) as a reference, were applied to sheets of glass in a layer having a thickness of 150 µm. The hardness was measured after drying times of 1, 6, 13 and 34 days under normal laboratory conditions (20° C., 65% RH) (DIN ISO 1522). The hardness of the coatings originating from the examples B-2AP and B-2A was up to 100% greater than that of the reference example.

Gloss and Degree of Whiteness on Coated Metal Sheets:

The metal sheets were pre-treated with a white were then treated with an organic UV filter and irradiated for 55 days in accordance with DIN53231.

After this time, the degree of whiteness to Berger of the sample with the organic UV filter is 81.5, whilst the samples with the compositions B-2A and B-3A according to the invention have values of 86.5 and 86 respectively.

After this time, the gloss (gloss angle 60°) of the compositions according to the invention B-2A/PU and B-3A/PU was greater by a factor of 7 to 10 than that of the reference sample.

UV-absorption and Transparency in Comparison with Dispersions Containing Zinc Oxide Powder According to the Prior Art 0.1 percent by weight dispersions (D4 to D7) of zinc oxide in water were produced by ultrasound dispersion and the UV-VIS spectra of these dispersions are recorded (layer thickness 1 mm).

Dispersion D4 (Example "according to the invention") contained a zinc oxide powder, as disclosed in the German patent application number 10342728.2, filed on Sep. 22, 2003, and having a BET specific surface area of 25 $m^2/g$.

Dispersion D5 (reference) contained the zinc oxide powder ZnO-410, Sumitomo Osaka, with a BET specific surface area of 34 $m^2/g$.

Dispersion D6 (reference) contained the zinc oxide powder Z-Cote®, nanophase with a BET specific surface area of 19 $m^2/g$.

Dispersion D7 (reference) contained the zinc oxide powder Zinvisible®, Zinc Corp. of America, with a BET specific surface area of 17 $m^2/g$.

FIG. 1 shows that dispersion D4 according to the invention had high absorption in the UV-A range and at the same time high transparency. In comparison with dispersions D5 to D7 dispersion D4 according to the invention had clear advantages in transparency with at least comparable UV absorption. This was surprising, in particular in comparison with dispersion D5, in which the zinc oxide powder had a higher BET specific surface area than that in dispersion D4 according to the invention.

Numerous modifications and variations on the present invention are possible in light of the above teachings. It is, therefore, to be understood that within the scope of the accompanying claims, the invention may be practiced otherwise than as specifically described herein.

The invention claimed is:

1. A dispersion comprising zinc oxide powder and at least one additive, wherein said zinc oxide powder has:
   a BET specific surface area of 10 to 200 $m^2/g$;
   an average secondary particle size in the dispersion of less than 300 nm; and
   a solid content of between 0.1 and 60 wt. % in relation to the total quantity of the dispersion,
   wherein the zinc oxide in said zinc oxide powder is in the form of aggregates, wherein said aggregates comprise particles of varying morphology and wherein the aggregates are present:
   0-10% in a circular form;
   30-50% in an ellipsoidal form;
   30-50% in a linear form; and
   20-30% in a branched form.

2. The dispersion according to claim 1, wherein said solid content is between 1 and 10 wt. % in relation to the total quantity of the dispersion.

3. The dispersion according to claim 1, wherein said dispersion is aqueous.

4. The dispersion according to claim 1, wherein said additive is selected from the group consisting of a dispersion auxiliary substance, an emulsifier, a pH value regulator, and a stabiliser.

5. The dispersion according to claim 1, wherein said zinc oxide powder is hydrophobised.

6. The dispersion according to claim 5, wherein the hydrophobised zinc oxide powder is a zinc oxide powder hydrophobised with octyl trimethoxysilane or polydimethyl siloxane.

7. The dispersion according to claim 5, wherein the hydrophobised zinc oxide powder has:
   a BET specific surface area of 18±5 $m^2/g$; and
   a carbon content of 0.5 to 1.0 wt. %.

8. The dispersion according to claim 1, wherein said zinc oxide powder contains:
   no more than 20 ppm lead;
   no more than 3 ppm arsenic;
   no more than 15 ppm cadmium;
   no more than 200 ppm iron;
   no more than 1 ppm antimony; and
   no more than 1 ppm mercury.

9. A process for the production of the dispersion according to claim 1, comprising incorporating said zinc oxide powder into a liquid medium by high energy input under dispersing conditions and adding said at least one additive before, during or after the dispersing conditions.

10. A coating preparation comprising the dispersion according to claim 1 and at least one binder.

11. The coating preparation according to claim 10, wherein said binder is selected from the group consisting of a polyacrylate, a polyurethane, a polyalkyd, a polyepoxide, a polysiloxane, a polyacrylonitrile, and a polyester.

12. The coating preparation according to claim 10, wherein the content of said binder in said coating preparation is between 0.1 and 50 wt. %.

13. The coating preparation according to claim 10, wherein the zinc oxide content is between 0.1 and 60 wt. %.

14. The coating preparation according to claim 10, wherein the zinc oxide content is between 1 and 10 wt. %.

15. The coating preparation according to claim 10, further comprising at least one rheology improving compound.

16. The coating preparation according to claim 10, further comprising at least one organic solvent.

17. A process for the production of the coating preparation according to claim 10, comprising adding said dispersion to said at least one binder under dispersing conditions.

18. A method of making a coated product comprising applying the coating preparation according to claim 10 to at least one surface of a product selected from the group consisting of wood, PVC, plastic, steel, aluminium, MDF, zinc, copper, glass, and concrete.

* * * * *